(12) United States Patent
Eun

(10) Patent No.: US 10,286,805 B2
(45) Date of Patent: May 14, 2019

(54) HYBRID ENERGY STORAGE MODULE SYSTEM

(71) Applicant: JSYOUNGTECH CO.,LTD, Anyang-si, Gyeonggi-do (KR)

(72) Inventor: Keun Soo Eun, Seoul (KR)

(73) Assignee: JSYOUNGTECH CO., LTD, Anyang-si, Gyeonggi-do (KR)

( * ) Notice: Subject to any disclaimer, the term of this patent is extended or adjusted under 35 U.S.C. 154(b) by 0 days.

(21) Appl. No.: 15/545,100

(22) PCT Filed: Jan. 20, 2016

(86) PCT No.: PCT/KR2016/000584
§ 371 (c)(1),
(2) Date: Jul. 20, 2017

(87) PCT Pub. No.: WO2016/117925
PCT Pub. Date: Jul. 28, 2016

(65) Prior Publication Data
US 2017/0368958 A1    Dec. 28, 2017

(30) Foreign Application Priority Data
Jan. 20, 2015 (KR) .................. 10-2015-0009369

(51) Int. Cl.
*H02J 7/00* (2006.01)
*B60L 11/18* (2006.01)
(Continued)

(52) U.S. Cl.
CPC ............ *B60L 11/1861* (2013.01); *B60L 7/10* (2013.01); *B60L 11/18* (2013.01);
(Continued)

(58) Field of Classification Search
CPC ............. B60L 11/1861; B60L 11/1809; B60L 11/1855; B60L 11/1862; B60L 11/1868;
(Continued)

(56) References Cited

U.S. PATENT DOCUMENTS

| | | | | |
|---|---|---|---|---|
| 2012/0169129 A1* | 7/2012 | Kim | ...................... | H01M 4/485 307/80 |
| 2014/0084863 A1* | 3/2014 | Nakamura | .............. | H02J 5/005 320/108 |

(Continued)

FOREIGN PATENT DOCUMENTS

| | | |
|---|---|---|
| JP | 11-007341 A | 1/1999 |
| JP | 2010-093993 A | 4/2010 |

(Continued)

*Primary Examiner* — Nha T Nguyen
(74) *Attorney, Agent, or Firm* — Novick, Kim & Lee, PLLC; Jae Youn Kim

(57) ABSTRACT

The present invention relates to an energy storage module system and, more specifically, to a hybrid energy storage module system selectively using, according to the amount of power required in a load, a lithium battery and a lead storage battery by mutually supplementing the lithium battery and the lead storage battery. According to the present invention, the hybrid energy storage module system is an energy storage module system for supplying power necessary for the driving of a load and comprises an energy storage device, a first sensing unit and a second sensing unit, and a controller. The energy storage device includes at least one lithium battery module and at least one lead storage battery module. In addition, the energy storage device includes a switching network configured so as to connect the lithium battery module and the lead storage battery module in different arrangement modes. The energy storage device is connected to both ends of a load and supplies power. The switching network can include a path for connecting the lithium battery module and the lead storage battery module, (Continued)

and a plurality of switches provided on the path. The first sensing unit is configured so as to measure the temperature and the voltage of the lithium battery modules, and the second sensing unit is configured so as to measure the temperature and the voltage of the lead storage battery module. The controller controls the switching network in order to change the arrangement modes of the lithium battery module and the lead storage battery module of the energy storage device.

7 Claims, 7 Drawing Sheets

(51) Int. Cl.
*B60L 7/10* (2006.01)
*B60W 10/26* (2006.01)
*H01M 10/0525* (2010.01)
*H01M 10/44* (2006.01)
*H01M 10/48* (2006.01)

(52) U.S. Cl.
CPC ....... *B60L 11/1809* (2013.01); *B60L 11/1855* (2013.01); *B60L 11/1862* (2013.01); *B60L 11/1868* (2013.01); *B60W 10/26* (2013.01); *H01M 10/0525* (2013.01); *H01M 10/443* (2013.01); *H01M 10/486* (2013.01); *H01M 10/488* (2013.01); *H02J 7/00* (2013.01); *H02J 7/0021* (2013.01); *B60L 2240/545* (2013.01); *B60L 2240/547* (2013.01); *Y02T 10/7011* (2013.01); *Y02T 10/7016* (2013.01); *Y02T 10/7044* (2013.01); *Y02T 10/7066* (2013.01)

(58) Field of Classification Search
CPC ...... B60L 11/18; B60L 7/10; B60L 2240/545; B60L 2240/547; H02J 7/0021; H02J 7/00; H01M 10/488; H01M 10/486; H01M 10/443; H01M 10/0525; B60W 10/26; Y02T 10/7016; Y02T 10/7066; Y02T 10/7044; Y02T 10/7011
See application file for complete search history.

(56) References Cited

U.S. PATENT DOCUMENTS

2014/0097799 A1 4/2014 Kim
2015/0295420 A1* 10/2015 Cheng .................. H02J 7/0003
                                                              320/128

FOREIGN PATENT DOCUMENTS

| JP | 2013-031249 A | 2/2013 |
| KR | 10-2005-0070726 A | 7/2005 |
| KR | 10-2005-0070727 A | 7/2005 |
| KR | 10-2011-0081622 A | 7/2011 |
| KR | 10-2013-0042088 A | 4/2013 |

\* cited by examiner

HYBRID ENERGY STORAGE MODULE SYSTEM

TECHNICAL FIELD

The present invention relates to an energy storage module system and, more specifically, to a hybrid energy storage module system configured to selectively use a lithium battery and a lead storage battery in a complementary manner depending on a change in the amount of power required in a load.

BACKGROUND ART

An energy storage system is a system which separately stores residual electric power and supplies the stored electric power in a timely manner. The energy storage system may be largely divided into a physical energy storage system and a chemical energy storage system depending on the manner of storage of energy. Examples of the representative physical energy storage system include a pumping-up power generation system, a compressed air storage system, a flywheel and the like. Examples of the chemical energy storage system include a lithium battery, a lead storage battery, a NaS battery and the like.

The energy storage system has been extensively studied in that the power supply/demand problem can be solved by storing electric power wasted at night and using the stored electric power in a peak time zone.

As one example of a small-size energy storage system, there is known a battery for an electric vehicle. The electric vehicle is a motor vehicle driven by an electric motor and is mounted with a large-capacity battery. In the past, a lead storage battery has been used as the battery for an electric vehicle. Nowadays, a nickel hydrogen battery and a lithium battery are mainly used. It is expected that the lithium battery will be mainly used in the future.

The lead storage battery used in the past has an advantage in that the price thereof is relatively low and the reliability thereof is high. However, the lead storage battery is problematic in that the output per unit weight is low, the volume is large, the output voltage is reduced when used for a long period of time, the discharge rate is low, and the lifespan is shortened due to overheating when frequently exposed to a load requiring a high output. Thus, the lead storage battery is not preferentially selected in an electric vehicle and the use thereof is evaded. In addition, the lead storage battery has a problem in that it is not suitable for charging the electric energy recovered through regenerative braking.

The lithium battery is a battery which is higher in output and density than other batteries. Thus, the lithium battery is spotlighted. However, the lithium battery is very expensive. The performance of the lithium battery depends largely on the temperature. In particular, electrolyte decomposition occurs at a high temperature. As a result, the lifespan of the lithium battery is sharply reduced. Furthermore, the lithium battery has a risk of fire and explosion. In order to improve such problems, methods for cooling a battery are disclosed in Korean Patent Application Publication Nos. 2010-0001877, 2003-0100891 and 2003-0100893.

The lead storage battery used at the present time is capable of storing electric energy of about 1 kWh per 10 kg. An electric vehicle can run 5 to 10 km using electric energy of about 1 kWh. Thus, in order for an electric vehicle to run a mileage of about 700 km, a lead storage battery of about 1 ton is necessary even if the lead storage battery has a high density. For that reason, a secondary battery of low density such as a lead storage battery or the like cannot be used as a battery for an electric vehicle.

However, an electric vehicle capable of driving about 100 km when charged once has a short mileage. Therefore, such an electric vehicle does not have to use a high-density battery. The use of a low-priced lead storage battery provides an advantage in that the cost is saved and the risk of fire and explosion is eliminated, which makes it unnecessary to use a complex cooling structure. Moreover, it is not necessary to consider the risk of fire and explosion when disposing the lead storage battery. This provides an advantage in that the lead storage battery can be disposed with a higher degree of freedom.

However, as described above, if the lead storage battery is used for a long period of time, the output voltage thereof becomes low. Therefore, the electric vehicle is difficult to run. Since the lead storage battery is lower in output than the lithium battery, the lead storage battery is difficult to cope with a case where a high output is required, such as a case where an electric vehicle restarts after stoppage or a case where an electric vehicle runs on a sloping road. The lead storage battery has a problem in that the lifespan thereof is shortened when the lead storage battery is frequently exposed to a load requiring a high discharge rate. In addition, the lead storage battery has a problem in that it cannot be used for charging electric energy generated by regenerative braking.

In the case of a conventional hybrid battery system that alternately uses different types of batteries, the amount of energy is sharply changed according to the change in the type of the battery used. This poses a problem in that a vehicle occupant or a user may feel a shock generated due to the change in the amount of energy. Moreover, there is a problem in that the energy efficiency is low.

Furthermore, in the case of using a hybrid battery system in a plug-in hybrid car, if driving and charging are simultaneously performed while driving a range extender, a problem is posed in that a motor vehicle has to be driven by a lead storage battery while charging a lithium battery.

PRIOR ART DOCUMENTS

Patent Documents

Korean Patent Application Publication No. 2010-0001877
Korean Patent Application Publication No. 2003-0100891
Korean Patent Application Publication No. 2003-0100893
Korean Patent No. 10-1281066
Japanese Patent Application Publication No. 2010-093993

SUMMARY

It is an object of the present invention to provide a hybrid energy storage module system capable of coping with a high output requirement and enjoying a high reliability. For example, the present invention provides a highly-reliable inexpensive hybrid energy storage module system for an electric vehicle capable of enabling an electric vehicle to run about 100 km when charged once.

Another object of the present invention is to provide a hybrid energy storage module system capable of improving energy consumption efficiency, reducing a sharp change in output, and enjoying a prolonged lifespan.

A further object of the present invention is to provide a hybrid energy storage module system capable of enhancing the efficiency of recovery of the energy generated by a regenerative braking device.

A still further object of the present invention is to provide a hybrid energy storage module system capable of maximizing the usability of a range extender in a plug-in hybrid car.

A hybrid energy storage module system according to the present invention for achieving the above objects is configured to supply electric power required for driving a load. The system includes an energy storage device, a first sensing unit, a second sensing unit and a controller.

The energy storage device includes one or more lithium battery modules and one or more lead storage battery modules. The energy storage device further includes a switching network configured to connect the lithium battery modules and the lead storage battery modules in different arrangement modes. The energy storage device is connected to both ends of the load so as to supply electric power to the load. The switching network may include a network for connecting the lithium battery modules and the lead storage battery modules, and a plurality of switches installed on the network.

The first sensing unit is configured to measure a temperature and a voltage of the lithium battery modules. The second sensing unit is configured to measure a temperature and a voltage of the lead storage battery modules.

The controller serves to control the switching network in order to change the arrangement mode of the lithium battery modules and the lead storage battery modules of the energy storage device. The controller includes a receiving unit, a measuring unit, a comparing unit, a signal generating unit and a transmitting unit.

The receiving unit is configured to receive values measured in the first sensing unit and the second sensing unit and an electric power value required for driving the load. The measuring unit is configured to measure a state of charge of the lithium battery modules and the lead storage battery modules using the values measured in the first sensing unit and the second sensing unit. The comparing unit is configured to compare the temperature of the lithium battery modules received by the receiving unit with a reference temperature and to compare the voltage of the lead storage battery modules received by the receiving unit with a reference voltage. The signal generating unit is configured to generate a control signal for controlling the switching network using the electric power value received by the receiving unit, the state of charge measured in the measuring unit and a comparison result of the comparing unit. The transmitting unit is configured to transmit the control signal to the switching network.

The hybrid energy storage module system according to the present invention selectively uses the lead storage battery modules and the lithium battery modules. This makes it possible to prevent the decrease in the output voltage of the lead storage battery modules and the deterioration of the lithium battery modules due to a temperature rise. Since the low-priced lead storage battery modules are used together with the lithium battery modules, it is possible to reduce the manufacturing cost.

Furthermore, the sharp change in the output power amount is alleviated step by step by the hybrid energy storage module system. It is therefore possible to improve the energy consumption efficiency and to prolong the battery lifespan.

Furthermore, there is no need to use a separate cooling system for preventing the temperature rise of the lithium battery due to the continuous use of the lithium battery. This makes it possible to simplify the structure of the hybrid energy storage module system. Since the lead storage battery is very stable, it is only necessary to install the lithium battery at a safe position in view of the safety of a vehicle occupant. This makes it possible to easily arrange the hybrid energy storage module system in an electric vehicle.

In some embodiments, when an instantaneous overload is applied during the regenerative braking, the lithium battery modules are charged alternately. This makes it possible to improve the energy recovery efficiency.

In the case where the hybrid energy storage module system is applied to a plug-in hybrid car, some of the lead storage battery modules are used for driving the plug-in hybrid car. The energy generated in the range extender is primarily charged in the lithium battery modules and secondarily recharged in the lead storage battery modules. This method makes it possible to maximize the usability of the hybrid energy storage module system.

DETAILED DESCRIPTION

Figure 1:
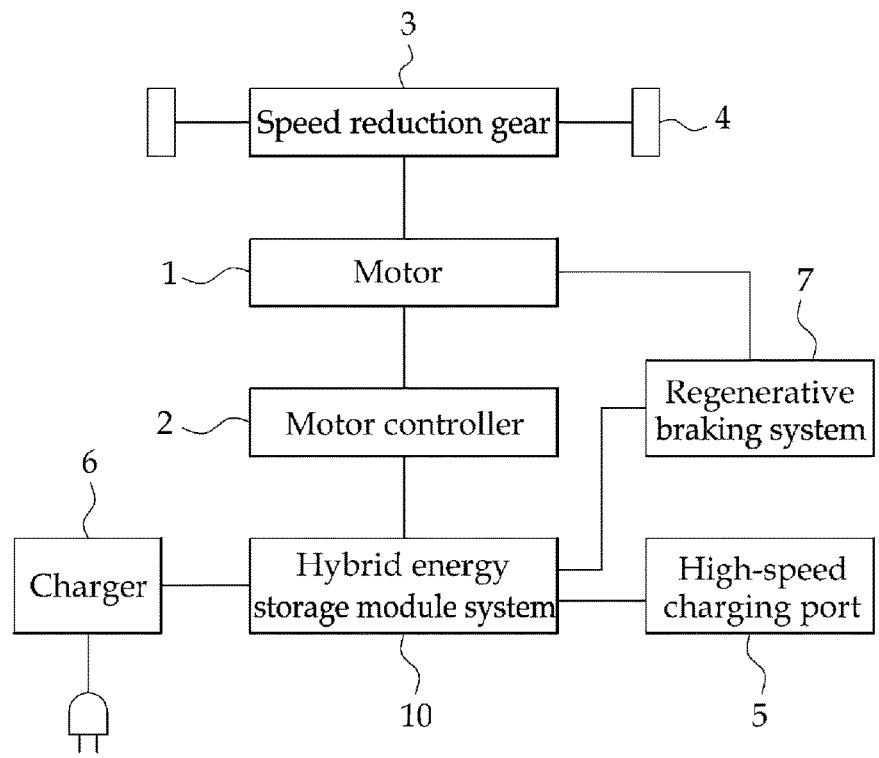
FIG. 1 is a system configuration diagram of an electric vehicle.

A preferred embodiment of the present invention will now be described in detail with reference to the accompanying drawings.

The embodiment to be described below is presented by way of example in order to make sure that the idea of the present invention is sufficiently delivered to those skilled in the art. Accordingly, the present invention is not limited to the embodiment described below and may be embodied in other forms. In the drawings, the width, length and thickness may be exaggerated for the sake of convenience. Throughout the specification, the same components are designated by like reference numerals.

The hybrid energy storage module system according to the present invention may be used for various applications. Hereinafter, a case where the hybrid energy storage module system is used for an electric vehicle will be described by way of example. The electric vehicle includes a hybrid car (HEV), a plug-in hybrid car (PHEV), a pure electric vehicle (EV), and the like. Furthermore, the electric vehicle includes a passenger car, a van, a bus, a two-wheeled vehicle such as a scooter or a motorcycle, a wheelchair, an electric forklift, a garbage truck, an electric bicycle, and the like. Hereinafter, the pure electric vehicle will be described by way of example.

FIG. 1 is a system configuration diagram of an electric vehicle. Referring to FIG. 1, the electric vehicle includes a motor 1, a motor controller 2, a hybrid energy storage module system 10, a speed reduction gear 3, and a regenerative braking system 7.

The motor 1 of the electric vehicle is also referred to as a motor generator. This is because, when a brake is applied during a travel, the motor 1 is used as a generator to charge an energy storage device such as a lithium battery module or a lead storage battery module of the hybrid energy storage module system 10. This is called regenerative braking. The motor 1 is connected to wheels 4 via the speed reduction gear 3.

The motor controller 2 includes a motor control part and an inverter for converting a direct current of a battery to a three-phase alternating current in order to drive the motor 1 in repose to a command of the motor control part. The inverter converts a direct current to an alternating current by switching a power transistor on and off.

The energy storage device 20 of the hybrid energy storage module system 10 may be charged via a high-speed charging port 5 used in a high-speed charging station similar to a general gas station or a typical charger 6 connected to a typical power supply provided in a home. In addition, the energy storage device 20 may be charged by the regenerative braking system 7.

Figure 2:
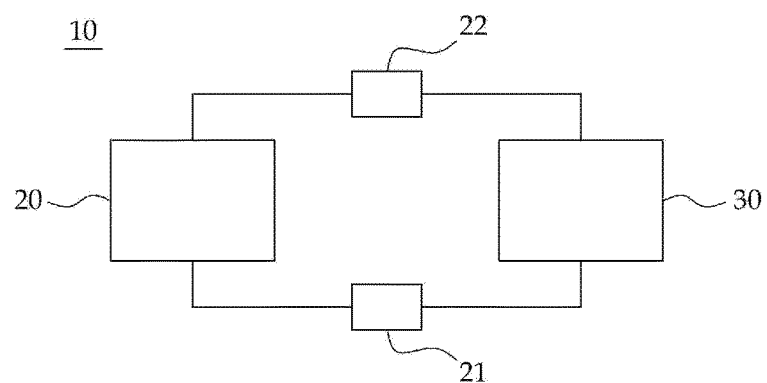
FIG. 2 is a block diagram of a hybrid energy storage module system according to one embodiment of the present invention.

FIG. 2 is a block diagram of the hybrid energy storage module system according to one embodiment of the present invention. Referring to FIG. 2, the hybrid energy storage module system 10 includes an energy storage device 20, a first sensing unit 21, a second sensing unit 22 and a controller 30.

Figure 3:
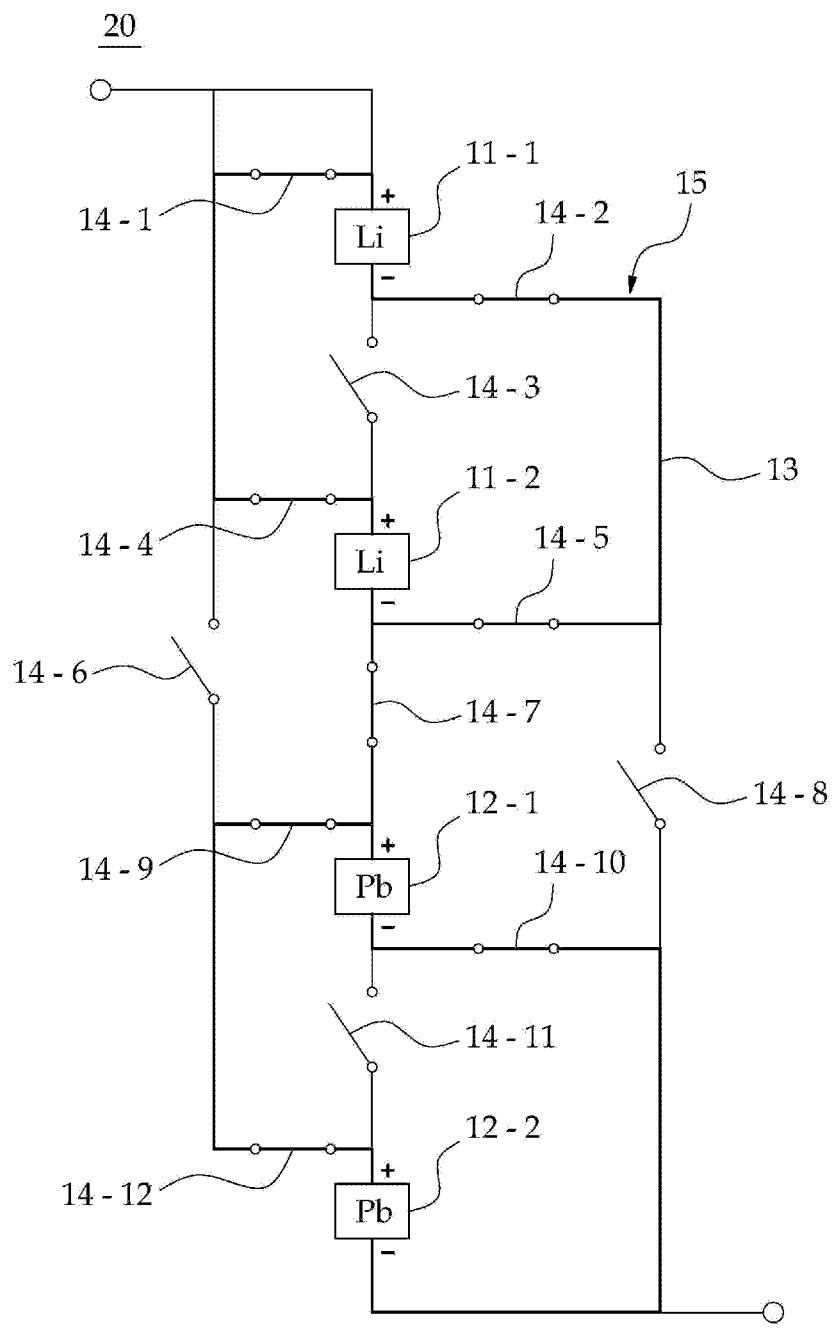
FIGS. 3 to 6 are views showing the arrangement modes of the energy storage device shown in FIG. 2.

FIG. 3 is a block diagram of the energy storage device shown in FIG. 2. Referring to FIG. 3, the energy storage device 20 includes two lithium battery modules 11, two lead storage battery modules 12 and a switching network 15. The energy storage device 20 is connected to both ends of a load and serves to supply electric power required in the motor 1 as a load. The switching network 15 includes conductive wires 13 configured to connect the lithium battery modules 11 and the lead storage battery modules 12, and a plurality of switches 14-1 to 14-12 installed in the conductive wires 13. While two lithium battery modules 11 and two lead storage battery modules 12 are shown in FIG. 3, it may be possible to use one or three or more lithium battery modules 11 and one or three or more lead storage battery modules 12.

Each of the lithium battery modules 11 includes a plurality of lithium battery cells (not shown) connected in series or in parallel. The performance of a battery can be represented by the magnitude of electric energy (unit: kWh) that can be collected by a battery, a discharge rate (C-rate) indicating a discharge amount per one hour in terms of the multiple of a battery capacity, and the like. As compared with a lead storage battery, a lithium battery is capable of storing a large amount of electric energy per unit weight and is high in charge/discharge rate. However, the lithium battery has a problem in that the properties thereof are deteriorated along with a temperature rise, the risk of explosion thereof is high, and the price thereof is very expensive. In the present invention, the lithium battery is a secondary battery in which metal lithium is used as a negative electrode. The lithium battery includes a lithium polymer battery, a lithium manganese battery, a lithium iron battery, a lithium ion battery, a lithium air battery, and the like. In addition, a lithium secondary battery currently under development or expected to be developed in the future may be used as the lithium battery.

Each of the lead storage battery modules 12 includes a plurality of lead storage battery cells (not shown) connected in series or in parallel. In a lead storage battery, the magnitude of electric energy that can be collected is small, and the amount of electric power that can be discharged is also small. However, the lead storage battery has an advantage in that it is a safe battery which is inexpensive and free from the risk of explosion. The lead storage battery has such a characteristic that the output voltage thereof is reduced when used for a long period of time and is restored only when a predetermined time elapses. Since the discharge rate of the lead storage battery is low, there is a limit for the lead storage battery to be used as a battery for an electric vehicle. In addition, the discharge rate of the lead storage battery is low. This poses a problem in that the lead storage battery is difficult to be used for charging the electric energy generated by regenerative braking.

As described above, the lithium battery modules 11 suffer from a problem of being deteriorated along with a temperature rise. Thus, the lithium battery modules 11 cannot be used for a long period of time without a cooling device. The lead storage battery modules 12 suffer from a problem that it cannot be used for a long period of time due to a decrease in output voltage and the charge/discharge rate thereof is low. In the present embodiment, such problems are solved by connecting the lithium battery modules 11 and the lead storage battery modules 12 in different forms using the switching network 15.

For example, when a drive voltage is 72 V and an output voltage of each of the lithium battery modules 11 and the lead storage battery modules 12 is 36 V, as shown in FIG. 3, a voltage of 72 V may be outputted by turning on the switches 14-1, 14-2, 14-4, 14-5, 14-7, 14-9, 14-10 and 14-12 so that two lithium battery modules 11 are connected in parallel, two lead storage battery modules 12 are connected in parallel and then the lithium battery modules 11 and the lead storage battery modules 12 are connected in series.

Figure 4:
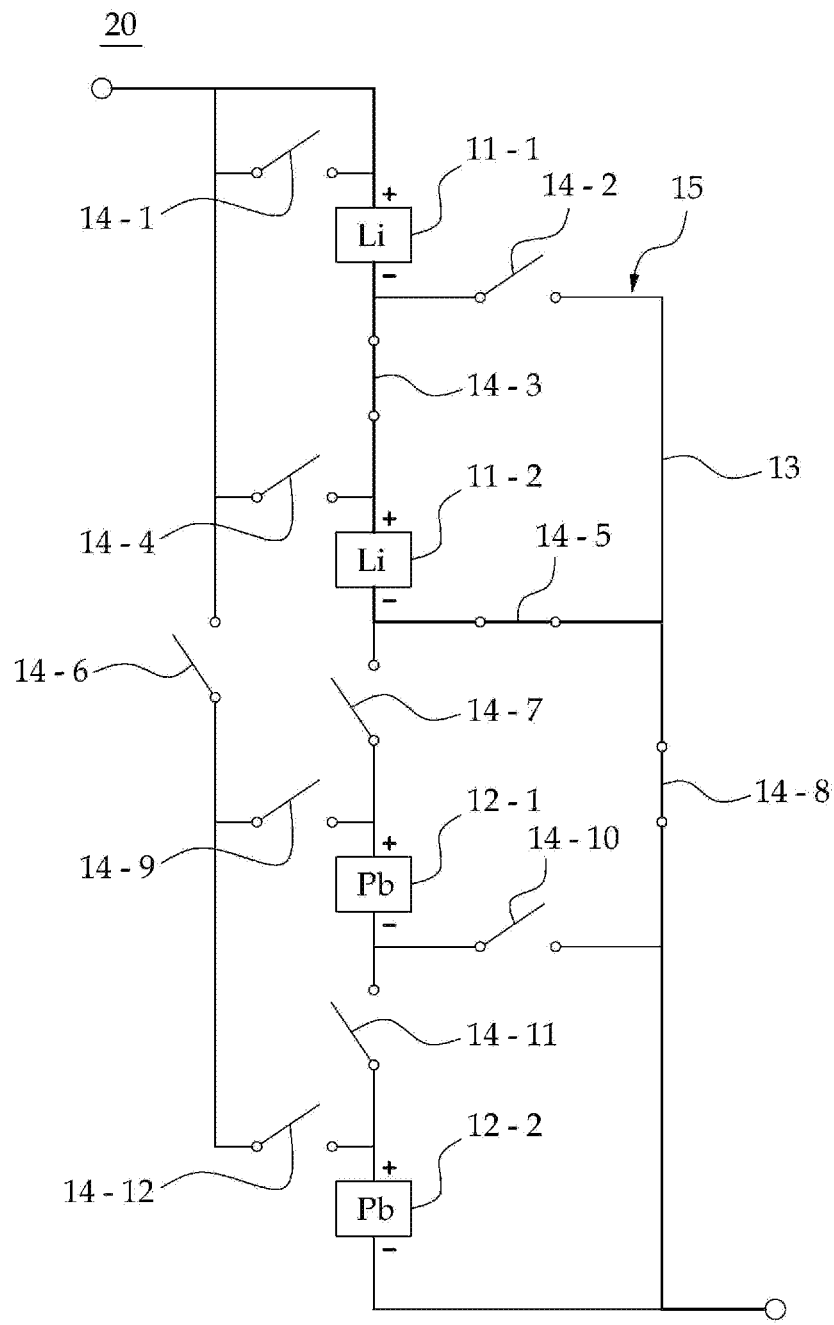

Furthermore, as shown in FIG. 4, a voltage of 72 V may be outputted by turning on the switches 14-3, 14-5 and 14-8 so that two lithium battery modules 11 are connected in series and the lead storage battery modules 12 are not used.

Figure 5:
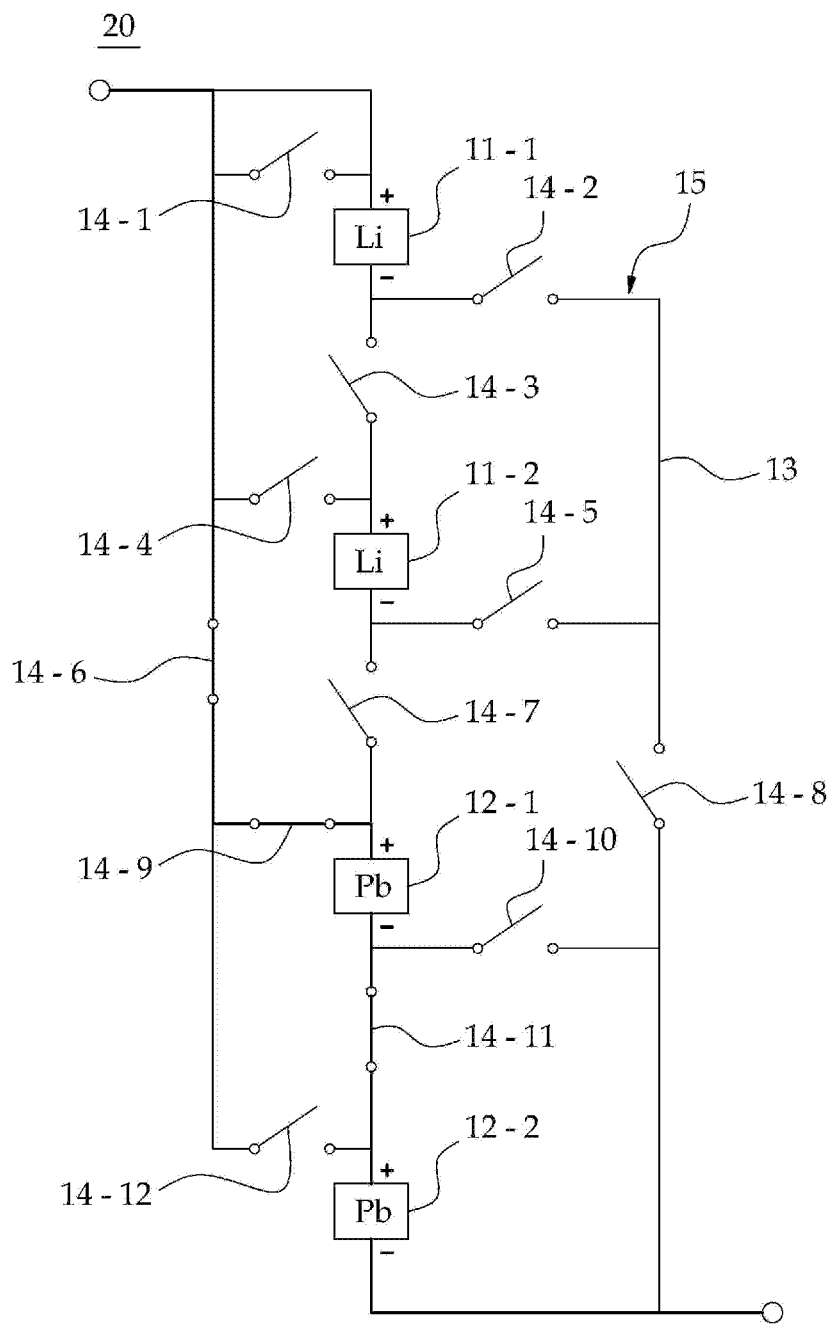

Moreover, as shown in FIG. 5, a voltage of 72 V may be outputted by turning on the switches 14-6, 14-9 and 14-11 so that two lead storage battery modules 12 are connected in series and the lithium battery modules 11 are not used.

Figure 6:
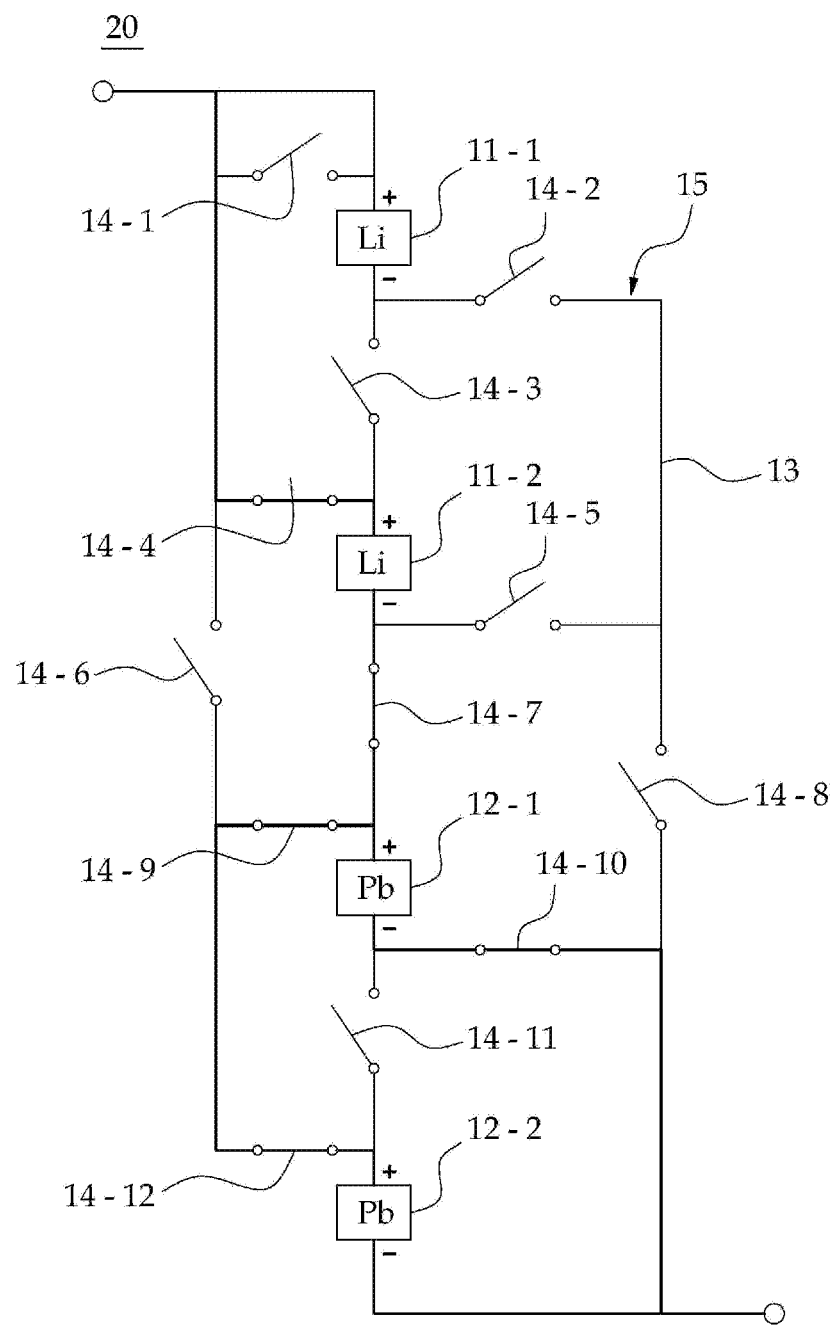

In addition, as shown in FIG. 6, a voltage of 72 V may be outputted by turning on the switches 14-4, 14-7, 14-9, 14-10 and 14-12 so that the lithium battery module 11-1 disposed on the upper side in FIG. 6 is not used and the lead storage battery modules 12 connected in parallel are connected to the lithium battery module 11-2 disposed on the lower side.

The arrangement mode to be used may be determined depending on the values measured in the first sensing unit 21 and the second sensing unit 22 and the output required in the motor 1.

The first sensing unit 21 is connected to the lithium battery cells of the lithium battery modules 11 and is configured to measure the temperature and voltage of each of the lithium battery cells. The first sensing unit 21 is connected in series through the use of a single communication line. The first sensing unit 21 may transmit information such as the temperature and voltage of each of the lithium battery cells to the controller 30 in a serial communication manner.

The second sensing unit 22 is connected to the lead storage battery cells of the lead storage battery modules 12 and is configured to measure the temperature and voltage of each of the lead storage battery cells. The second sensing unit 22 may transmit information such as the temperature and voltage of each of the lead storage battery cells to the controller 30.

The controller 30 monitors the states of the lithium battery modules 11 and the lead storage battery modules 12 of the energy storage device 20 and manages the energy storage device 20 so that the energy storage device 20 can be maintained and used under an optimal condition.

Figure 7:
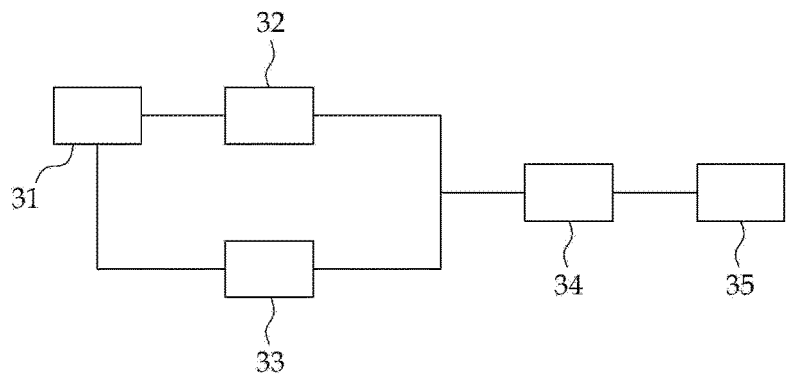
FIG. 7 is a block diagram of the controller shown in FIG. 2.

As shown in FIG. 7, the controller 30 includes a receiving unit 31, a measuring unit 32, a comparing unit 33, a signal generating unit 34 and a transmitting unit 35. The controller 30 monitors the states such as the temperature and the voltage of the cells of the lithium battery modules 11 and the lead storage battery modules 12 based on the information transmitted from the first sensing unit 21 and the second sensing unit 22. Furthermore, the controller 30 serves to generally control the energy storage device 20 by transmitting a control signal, which is generated on the basis of the states of the cells and the information received from the motor controller 2, to the switching network 15 and changing the arrangement mode of the lithium battery modules 11 and the lead storage battery modules 12.

The receiving unit 31 receives data such as the temperature and the voltage measured by the first sensing unit 21 and the second sensing unit 22. Furthermore, the receiving unit 31 receives data on the electric power necessary for driving the motor 1 from the motor controller 2.

The measuring unit 32 measures the state of charge (SOC) of the lithium battery modules 11 and the lead storage battery modules 12 in a Coulomb count manner or the like using the data transmitted from the receiving unit 31, thereby determining the state of health (SOH). In addition, the measuring unit 32 estimates the electric power that can be outputted to the load.

The comparing unit 33 compares the temperature of the lithium battery cells with a predetermined reference temperature using the data transmitted from the receiving unit 31, thereby inspecting whether the lithium battery cells are in a safe state. In addition, the comparing unit 33 compares the voltage of the lead storage battery cells with a predetermined reference voltage, thereby inspecting whether the lead storage battery cells are in a usable state.

In view of the state of charge of the lithium battery modules 11 and the lead storage battery modules 12, the temperature of the lithium battery modules 11, the voltage of the lead storage battery modules 12 and the driving state transmitted from the motor controller 2, the signal generating unit 34 generates a control signal for determining the arrangement mode of the lithium battery modules 11 and the lead storage battery modules 12 and transmits the control signal to the energy storage device 20.

For example, when the lithium battery modules 11 and the lead storage battery modules 12 are sufficiently charged and the motor vehicle is driving at a constant speed at which a particularly high output is not required, the lithium battery modules 11 and the lead storage battery modules 12 may be arranged in the arrangement mode shown in FIG. 3 so that they can be used together.

If the voltage of the lead storage battery modules 12 is reduced a reference voltage or lower due to the use of the lead storage battery modules 12 for a long period of time, the controller 30 generates a control signal for adopting the arrangement mode in which the lithium battery modules 11 are connected in series as shown in FIG. 4, and transmits the control signal to the energy storage device 20.

When the voltage of the lead storage battery modules 12 becomes higher than the reference voltage after a predetermined time period elapses, the controller 30 generates a control signal for adopting the arrangement mode shown in FIG. 3 and transmits the control signal to the energy storage device 20.

If the temperature of the lithium battery modules 11 is increased to a reference temperature or higher due to the continuous use of the lithium battery modules 11, the controller 30 generates a control signal for adopting the arrangement mode in which the lead storage battery modules 12 are connected in series as shown in FIG. 5, and transmits the control signal to the energy storage device 20.

When the temperature of one of the lithium battery modules 11 is increased to the reference temperature or higher, the controller 30 generates a control signal for adopting the arrangement mode in which the lead storage battery modules 12 parallel-connected to one of the lithium battery modules 11 are connected in series as shown in FIG. 6, and transmits the control signal to the energy storage device 20.

The controller 30 is connected to the motor controller 2 and is capable of checking the driving state of the motor vehicle, such as the restart after stoppage, the driving on a sloping road, or the like. Hereinafter, description will be made on the change of the arrangement mode depending on the driving state of the motor vehicle. The controller 30 is configured to convert the arrangement mode depending on the driving state of the motor vehicle. However, if it is difficult to convert the arrangement mode in conformity with the driving state when considering the state of the lithium battery modules 11 and the lead storage battery modules 12, the controller 30 may adopt an arrangement mode for protecting the lithium battery modules 11 and the lead storage battery modules 12, instead of converting the arrangement mode in conformity with the driving state.

If a large output is required depending on the driving state, the controller 30 generates a control signal for discharging the lithium battery modules 11 in the arrangement mode in which the lithium battery modules 11 are connected in series as shown in FIG. 4, and transmits the control signal to the energy storage device 20. This is because the lead storage battery modules 12 have low usable electric power even when they are sufficiently charged.

Figure 8:
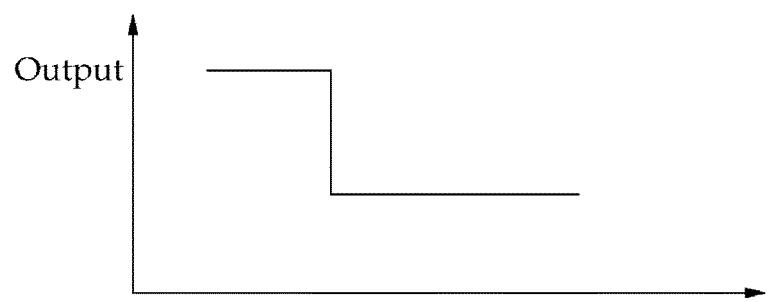
FIGS. 8 and 9 are views showing changes in the output of the energy storage device according to the conversion of the arrangement mode.

At this time, if the arrangement mode is suddenly converted, the output of the energy storage device 20 may be sharply changed and a shock may be generated. Accordingly, it is preferred that a mode conversion process goes through the arrangement mode shown in FIG. 3 or FIG. 6 prior to the conversion to the arrangement mode shown in FIG. 4. If the arrangement mode in which the lead storage battery modules 12 are connected in series as shown in FIG. 5 is directly converted to the arrangement mode shown in FIG. 4, the discharge rate may be sharply increased as shown in FIG. 8 and the output of the energy storage device 20 may be sharply changed. However, if the mode conversion process goes through the arrangement mode shown in FIG. 3 or FIG. 6, the output of the energy storage device 20 is changed step by step. If necessary, the mode conversion process may sequentially goes through all the arrangement modes shown in FIGS. 3 and 6. Conversely, when the arrangement mode of FIG. 5 in which only the lead storage battery modules 12 are used is adopted because a large output is not required, the mode conversion process may go through the arrangement mode shown in FIG. 3 or FIG. 6.

In other words, when the energy storage device 20 is converted to the arrangement mode in which only the lead storage battery modules 12 or the lithium battery modules 11 are used, it is preferred that the mode conversion process goes through the arrangement mode in which both the lead storage battery modules 12 and the lithium battery modules 11 are used.

Figure 9:
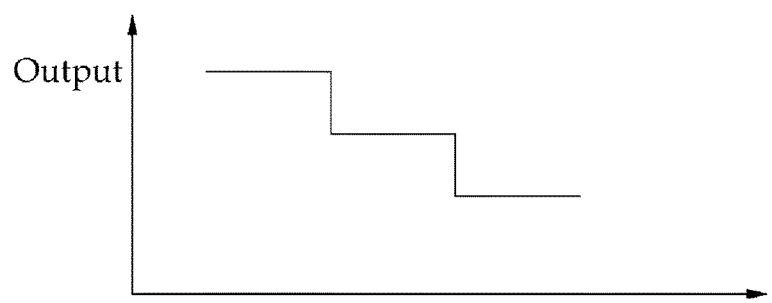

FIG. 9 is a view for explaining the advantages of the hybrid energy storage module system according to the present invention. In the case of the conventional hybrid battery system, when the high output driving is converted to the low output driving, there is no way but to select one of the mode using the high output of the lithium battery modules and the mode using the low output of the lead storage battery modules. However, in the case of the hybrid energy storage module system according to the present invention, the mode using the high output lithium battery modules can be converted to the mode using the low output lead storage battery modules via an intermediate mode in which some of the lithium battery modules are connected in series to the lead storage battery modules. This holds true in the case of a sharp increase in output. In some cases, the output may be reduced or increased step by step. This makes it possible not only to improve the ride comfort of a driver or a passenger but also to save the energy and enhance the efficiency.

When there is a need to perform the charging using the regenerative braking or the charging using a typical power supply, one of the lithium battery modules may be separated for a charging purpose as shown in FIG. 6 and may be connected to a charging device. Alternatively, two lithium battery modules may be separated for a charging purpose as shown in FIG. 5 and may be connected to a charging device. Since the lead storage battery modules 12 are low in charging efficiency and charging rate, it is preferred that, when performing a charging operation, the lithium battery modules 11 are separated from the lead storage battery modules 12 and are connected to a charging device.

In particular, the lead storage battery modules 12 are hardly charged by the regenerative braking. Therefore, during the regenerative braking, it is preferred that the regenerative braking system 7 is preferentially connected to the lithium battery modules 11 having a low voltage or a low state of charge so as to first charge the lithium battery modules 11.

Furthermore, when the lithium battery modules 11 are charged, the lead storage battery modules 12 may be charged using the electric energy of the lithium battery modules 11. In this case, the controller 30 transmits to the switching network 15 a control signal for adopting the arrangement mode in which the charged lithium battery modules 11 and the lead storage battery modules 12 to be charged are connected to each other.

In other words, it is preferred that the regenerative braking system 7 and other charging devices are configured to charge the lithium battery modules 11, and the lead storage battery modules 12 are charged by the electric energy stored in the lithium battery modules 11. Alternatively, some of the lead storage battery modules 12 may be charged by the charging device and the remaining lead storage battery modules 12 may be charged by the electric energy stored in the lithium battery modules 11. The charging of the lead storage battery modules 12 may be performed in a state in which the charging of the lithium battery modules 11 is completed or in a state in which the charging of the lithium battery modules 11 is underway.

In this way, the hybrid energy storage module system according to the present embodiment can control the lithium battery modules 11 and the lead storage battery modules 12 in a balanced manner by appropriately changing the arrangement mode of the energy storage device 20 depending on the state of the lithium battery modules 11 and the lead storage battery modules 12 and the driving state of the motor vehicle. This makes it possible to prolong the lifespan of the battery.

Figure 10:
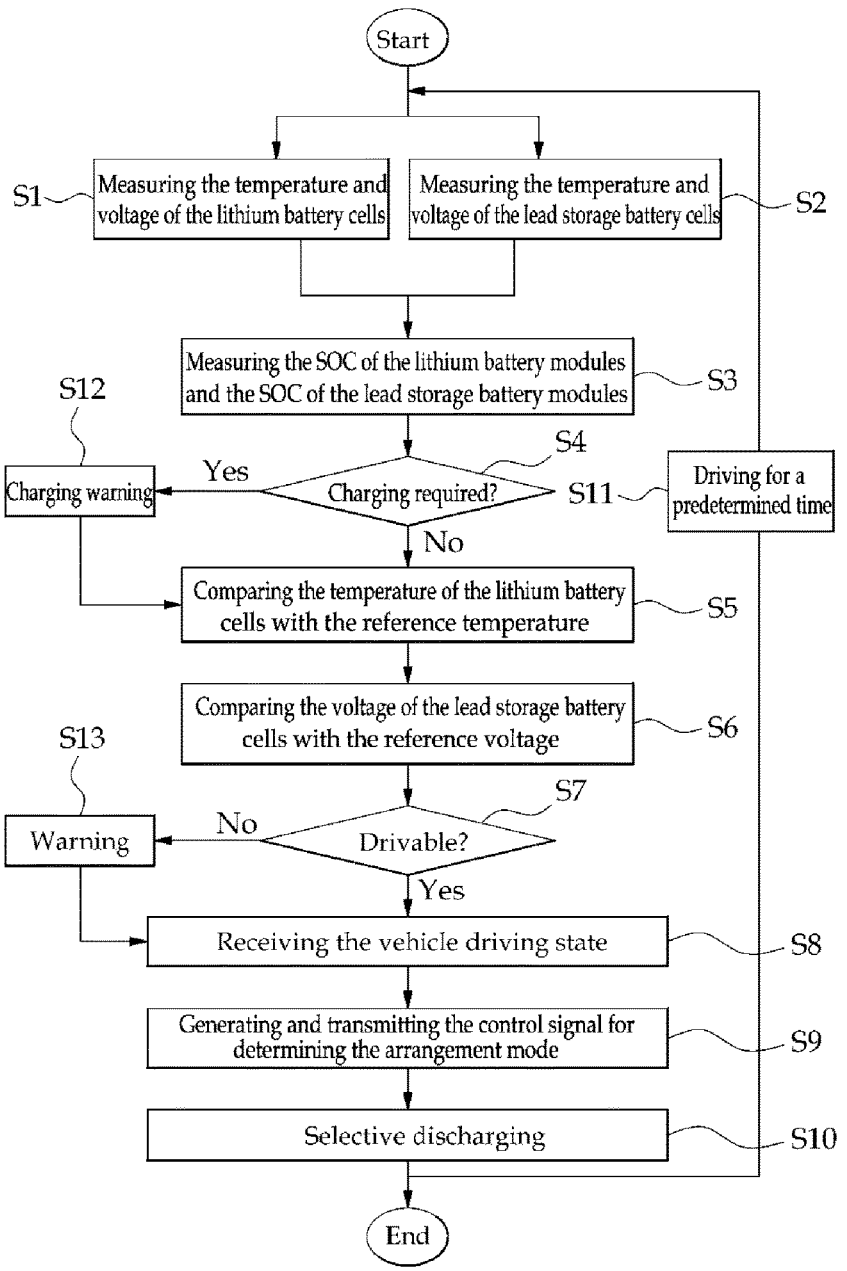
FIG. 10 is a flowchart showing the operation of the hybrid energy storage module system according to one embodiment of the present invention.

Hereinafter, the operation of the hybrid energy storage module system will be described with reference to FIG. 10.

If the driving of the electric vehicle is started, the first sensing unit 21 and the second sensing unit 22 measure the temperature and voltage of the cells of the lithium battery modules 11 and the cells of the lead storage battery modules 12 (S1 and S2).

Next, the measuring unit 32 of the controller 30 measures the state of charge and the state of health of the lithium battery modules 11 and the lead storage battery modules 12 using the data acquired by the first sensing unit and the second sensing unit 22 (S3). Based on the measurement result of the state of charge, the controller 30 determines whether the electric vehicle is in a drivable state (S4). If the measurement result reveals that the electric vehicle is in a drivable state, the measured state of charge is notified to a driver via a display installed in the driver's seat of the electric vehicle. If the charging is required due to the low state of charge of the lithium battery modules 11 and the lead storage battery modules 12, the necessity of charging is notified to the driver via the display installed in the driver's seat of the electric vehicle (S12).

Next, the comparing unit 33 of the controller 30 compares the temperature of the respective cells of the lithium battery modules 11 measured by the first sensing unit with a reference temperature (S5). Furthermore, the comparing unit 33 compares the voltage of the respective cells of the lead storage battery modules 12 measured by the second sensing unit 22 with a reference voltage (S6). If the comparison result reveals that the temperature of the respective cells of the lithium battery modules 11 is higher than the reference temperature and the voltage of the respective cells of the lead storage battery modules 12 is lower than the reference voltage, which makes it difficult to drive the electric vehicle, the controller 30 issues a warning to the driver via the display installed in the driver's seat of the electric vehicle so that the driver can cope with the situation (S13). If necessary, the controller 30 may stop the driving of the electric vehicle.

Next, the controller 30 receives information on the driving state of the electric vehicle from the motor control part of the motor controller 2 (S8). Specifically, the controller 30 receives information on the driving state of the electric vehicle such as the driving at a constant speed, the restart after stoppage, the driving on a sloping road, or the like.

Steps S4 to S8 are performed under the control of the controller 30 and may be performed simultaneously or in an order differing from the aforementioned order.

Next, the signal generating unit 34 of the controller 30 generates a control signal for determining the arrangement mode based on the results obtained in steps S4 to S8 and transmits the control signal to the energy storage device 20 (S9).

Next, the energy storage device 20 arranges the lithium battery modules 11 and the lead storage battery modules 12 in response to the control signal and starts discharging (S10).

After a predetermined time period elapses (S11), steps S1 to S10 are repeated.

While the preferred embodiment of the present invention has been described above, the present invention is not limited to the specific embodiment described above. Those skilled in the art will be able to make different modifications without departing from the spirit and scope of the present

DESCRIPTION OF REFERENCE NUMERALS

| | |
|---|---|
| 1: motor 1 | 2: motor controller |
| 3: speed reduction gear | 11: lithium battery module |
| 10: hybrid energy storage module system | 15: switch |
| 20: energy storage device | 22: Second sensing unit |
| 12: Lead storage battery module | |
| 13: switching network | |
| 21: first sensing unit | |
| 30: controller | |

What is claimed is:

1. A hybrid energy storage module system for supplying electric power required for driving a load, the system comprising:
an energy storage device including one or more lithium battery modules, one or more lead storage battery modules and a switching network configured to provide a plurality of arrangement modes by connecting the one or more lithium battery modules and the one or more lead storage battery modules, the energy storage device being connected to the load to supply electric power to the load; and
a controller including a signal generating unit configured to generate a control signal for controlling the switching network and a transmitting unit configured to transmit the control signal to the switching network,
wherein the controller is configured to convert an arrangement mode of the energy storage device via a first arrangement mode in which the lithium battery modules connected in parallel or one of the lithium battery modules are/is connected in series to the lead storage battery modules connected in parallel or one of the lead storage battery modules, when the arrangement mode of the energy storage device is converted from a second arrangement mode in which the lithium battery modules are connected in series to a third arrangement mode in which the lead storage battery modules are connected in series, or when the arrangement mode of the energy storage device is converted from the third arrangement mode to the second arrangement mode.

2. The system of claim 1, wherein the controller is configured to generate a control signal for converting the arrangement mode of the energy storage device so that the one or more lithium battery modules of the energy storage device are charged when charging the energy storage device by way of regenerative braking.

3. The system of claim 1, wherein the controller is configured to generate a control signal for converting the arrangement mode of the energy storage device so that when charging the energy storage device, the one or more lead storage battery modules are charged by electric energy of the one or more lithium battery modules charged earlier than the one or more lead storage battery modules.

4. The system of claim 1, further comprising:
a first sensing unit configured to measure a temperature and a voltage of the one or more lithium battery modules; and
a second sensing unit configured to measure a temperature and a voltage of the one or more lead storage battery modules,
wherein the controller further includes a receiving unit configured to receive values measured in the first sensing unit and the second sensing unit and an electric power value required for driving the load, a measuring unit configured to measure a state of charge of the one or more lithium battery modules and the one or more lead storage battery modules using the values measured in the first sensing unit and the second sensing unit, and a comparing unit configured to compare the temperature of the one or more lithium battery modules received by the receiving unit with a reference temperature and to compare the voltage of the one or more lead storage battery modules received by the receiving unit with a reference voltage, and
wherein the signal generating unit is configured to generate the control signal for controlling the switching network using the electric power value received by the receiving unit, the state of charge measured in the measuring unit and a comparison result of the comparing unit.

5. The system of claim 4, wherein the controller is configured to generate the control signal for controlling the switching network so that one or more of the lithium battery modules having the temperature higher than the reference temperature and one or more of the lead storage battery modules having the voltage lower than the reference voltage are not connected to the load.

6. The system of claim 1, wherein the switching network includes a plurality of switches installed in a network for connecting the one or more lithium battery modules and the one or more lead storage battery modules.

7. The system of claim 1, wherein the one or more lithium battery modules include a lithium battery selected from a group consisting of a lithium polymer battery, a lithium manganese battery, a lithium iron battery, a lithium ion battery and a lithium air battery.

* * * * *